C. W. STAHLE.
FLUID GAGE.
APPLICATION FILED JUNE 12, 1914.
1,141,499.
Patented June 1, 1915.
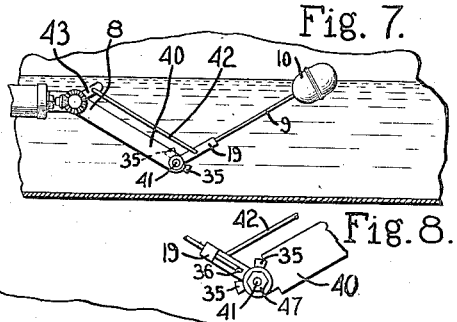
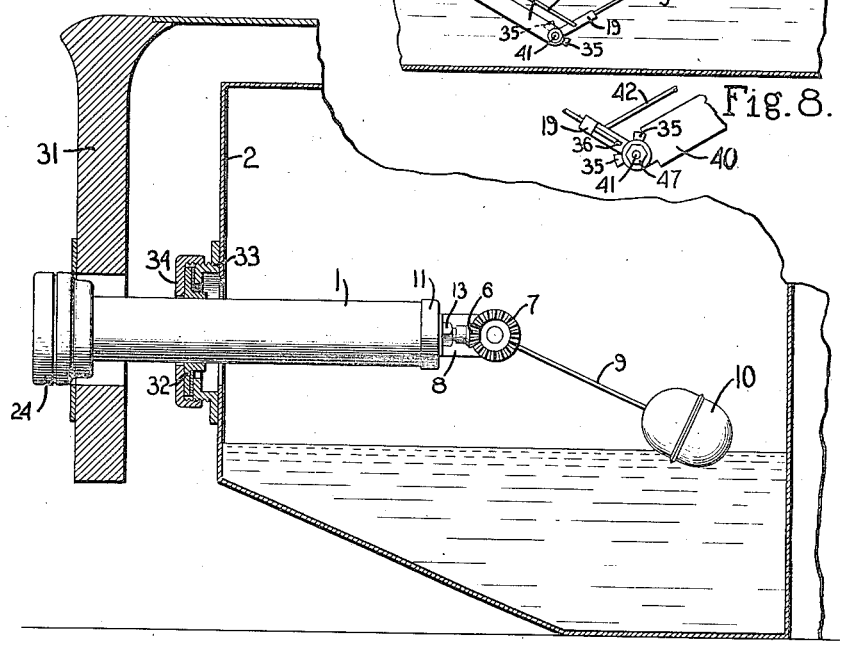
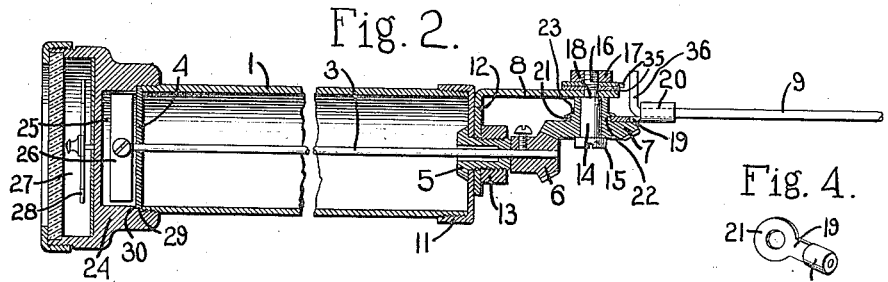
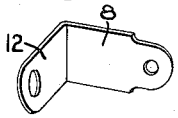
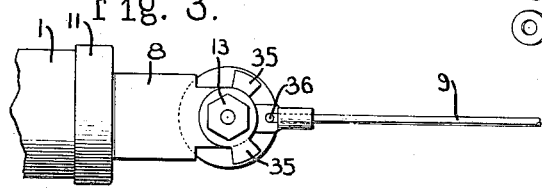
Witnesses.
J. Morrill Fuller
William E. Gagen
Inventor.
Carl W. Stahle
by Heard Smith & Tennant.
Att'y's

UNITED STATES PATENT OFFICE.

CARL W. STAHLE, OF EVERETT, MASSACHUSETTS, ASSIGNOR TO BOSTON AUTO GAGE COMPANY, OF BOSTON, MASSACHUSETTS, A CORPORATION OF MASSACHUSETTS.

FLUID-GAGE.

1,141,499.     Specification of Letters Patent.     Patented June 1, 1915.

Application filed June 12, 1914. Serial No. 844,816.

*To all whom it may concern:*

Be it known that I, CARL W. STAHLE, a citizen of the United States, residing at Everett, county of Middlesex, State of Massachusetts, have invented an Improvement in Fluid-Gages, of which the following description, in connection with the accompanying drawing, is a specification, like characters on the drawing representing like parts.

This invention relates to fluid gages for indicating the level of a fluid in a tank or container and has for its object to provide a novel gage for this purpose which can be used either in the side or the top of the tank as most convenient, which can be cheaply manufactured, and which will be reliable in use, and which will have other advantages, all as will be more fully hereinafter described.

A gage embodying my invention is capable of general use wherever fluid gages are desired, but the gage has many advantages when used as a gasolene gage for automobiles, as the gage can either be set into the tank in an upright position so as to lead from the top of the tank, or can be set into the side of the tank, so as to operate as a so-called "cowl" gage.

In order to give a proper understanding of my invention I have shown it herein as it would be used as a "cowl" gage for indicating the level of the gasolene in the tank of an automobile, but as stated above, the invention is not limited to use in this particular way.

In the drawings Figure 1 is a view partly in section showing my improved gage as installed as a cowl gage for indicating the level of the gasolene in the gasolene tank of an automobile; Fig. 2 is a longitudinal central sectional view through the gage; Fig. 3 is a detail view showing the mounting of the float arm; Fig. 4 is a detail view of the holder for the float arm; Fig. 5 is a perspective view of the bracket on which one of the beveled gears is mounted; Fig. 6 is a perspective view of one of the adjustable stops for the float arm, and Fig. 7 is a fragmentary view showing a different embodiment of the invention; Fig. 8 is a fragmentary detail view showing the connection between the float arm and the extension 40 of the bracket.

In my improved gage the indicator is actuated from a shaft which is sustained in a tubular support that extends through the side of the tank, and the position of this shaft is controlled from a float arm which is connected to the shaft through bevel gearing, the float arm and one of the bevel gears being suitably mounted on a bracket carried by the end of the tubular support.

The tubular support is shown at 1 and it is adapted to extend through the wall of the tank 2 in which the gage is installed. This tubular support sustains a shaft 3 which is journaled at one end in a cap or plate 4 carried at one end of the support 1, and at the other end is journaled in a bearing 5 sustained by the other end of the support 1. This shaft 3 projects beyond the bearing 5 which is located at that end of the support 1 that is situated within the tank 2, and said projecting end carries a bevel gear 6 which meshes with another bevel gear 7 that is suitably journaled on a bracket 8 secured to the tubular support 1. The gear 7 has connected thereto a float arm 9 which carries at its outer end a float 10. As the float arm 9 swings or turns its motion will be communicated to the shaft 3 through the bevel gears 6 and 7, as will be obvious, thus turning the shaft, and the latter will cause the indicating pointer to be turned, thus indicating the position of the float arm. In the illustrated embodiment of my invention the tubular support 1 is formed by a tube of the proper length, to the inner end of which is screw-threaded a cap 11 in which the bearing 5 is mounted. The bracket 8 is provided with the foot portion 12 which overlies the outer face of the cap 11 and through which the bearing 5 extends, said foot portion being held clamped to the cap 11 by means of a clamping nut 13 which has screw-threaded engagement with the bearing member 5. The bracket 8 may be conveniently made from sheet metal stamped up into the desired shape. This manner of mounting the bracket provides a construction whereby the bracket may be turned in any desired or necessary position about the bearing member 5. The gear 7 is shown as mounted on a stud 14 which is carried by the bracket 8, said stud being herein shown as provided with a head 15 which engages the inner face of the gear 7 and with a reduced portion 16 which projects through the bracket 8 and to which a clamping nut 17 is screwed, the shoulder 18 between the reduced portion 16 and the body of the stud engaging the inner face of the bracket 8 and being clamped thereagainst by the nut 17. The float arm 9 is connected to the gear 7 in some suitable way so that as the arm rises and falls the gear will be turned. Said float arm may be directly connected to the gear as shown in Figs. 1, 2 and 3 or it may be indirectly connected to the gear through a link as shown in Fig. 7. Referring first to the construction shown in Figs. 1, 2, and 3 said float arm is shown as carried by a holder 19, which is shown best, in Fig. 4, and may conveniently be made of sheet metal. This holder is shown as having a tubular portion 20, into which the end of the float arm 9 extends, and a body portion 21 through which the hub of the gear 7 extends, said body portion resting flat against the outer face of the gear.

In order to provide a simple and inexpensive way of permanently connecting the holder 19 to the gear 7, I have shown the hub of the gear as provided with the enlarged portion 22 on which the body of the holder is positioned, and the holder is retained in place by staking and flanging over the edge portion 23 of the part 22, as clearly seen in Fig. 2.

In Fig. 7 I have shown a construction wherein the float arm is pivoted to the bracket separately from the gear 7 and is connected thereto by a link. In said construction the bracket 8 is formed with an extension 40 to the end of which the holder 19 of the float arm 9 is pivotally mounted as at 41. This holder is connected by a link 42 with an arm 43 that is secured to the beveled gear 7 so that as the float arm rises and falls a movement will be given to the gear 7.

The indicating pointer may be actuated from the shaft 3 in any suitable way. I have herein shown a magnetic gage wherein the indicating pointer is actuated magnetically from the shaft 3.

The tubular support 1 is shown as provided at its outer end with a head 24 provided with a recess 25 in which is received a magnet 26 that is fixedly secured to the shaft 3. This head 25 is also provided with an outer recess 27 in which is pivotally mounted a magnetic needle 28 that operates over a dial in the usual manner. The position of the needle 28 will be controlled by the magnet 26 and the position of the magnet is in turn controlled by the float 10. As shown in Fig. 2 the head 24 is screwed to the end of the tube 1, and in order to simplify and cheapen the construction I propose to hold the disk 4 in place by clamping it between the head 24 and the end of the tube 1. The end of the tube 1 is rabbeted at 29 to receive the plate 4 and the head 24 is provided with the shoulder 30 which engages the periphery of the plate 4 and clamps it in position.

A gage made in accordance with this invention could be installed in the tank either in an upright, horizontal or inclined position. In the drawings I have shown it installed in a horizontal position and extending through the end of the tank, this being the position in which it would be used when installed as a cowl gage of an automobile.

In Fig. 1 the gasolene tank 2 is situated adjacent the cowl or dash-board 31 and the gage is so placed in the end of the tank 2 that the head 24 thereof will extend through the cowl 31 to be visible to the person operating the car.

For securing the tubular support 1 to the tank I propose to provide the tube 1 with a flange 32 which is adapted to be clamped between a flange 33 firmly secured to the tank, and a clamping ring 34 which is screwed to the flange 33, suitable packing being provided if necessary to make a tight joint. The flange 32 may be secured to the tubular support 1 in any suitable way as by means of soldering or brazing. When the gage is installed, as shown in Fig. 1, it is often desirable to provide means for limiting the swinging movement of the arm 9 and I have provided for this purpose two adjustable stops 35 which are mounted on the reduced portion 16 of the stud 14 and are clamped between the nut 17 and the bracket 8 and have provided the float arm 9 with a laterally-extending stop finger 36 which plays between said stops 35. These stops can be adjusted relative to each other so as to limit the swinging movement of the float arm in both directions. The stop finger 36 can conveniently be made by bending the end of the float arm 9 laterally. These same adjustable stops 35 can be used in the construction shown in Fig. 7, in which case they are mounted on the stud 41, to which the float arm is pivoted in the same manner as they are mounted on the stud 14 in Fig. 2. This stud 41 will preferably have the same construction as the stud 14 and the stops 35 can be clamped against the bracket by the nut 47 on the stud 41. In Fig. 7 the float arm is provided with a laterally extended finger 36 which plays between and coöperates with the stop member 35 to limit the swinging movement of the float.

While I have illustrated herein a selected embodiment of my invention, I do not wish to be limited to the constructional features shown.

I claim:

1. In a fluid gage, the combination with a supporting member adapted to be extended through the wall of a tank, of a bracket at one end of said supporting member, a shaft bearing at said end of the supporting member separate from the bracket and by which the bracket is held in position, an indicator-operating shaft extending longitudinally of the supporting member and rotatably mounted in said bearing member, a float-controlled bevel gear journaled on the bracket, and a bevel gear intermeshing therewith and carried by said shaft.

2. In a fluid gage, the combination with a supporting member adapted to be inserted through the wall of a tank and provided with a shaft bearing, of an indicator-operating shaft extending longitudinally of said member and rotatably mounted in said bearing, an indicator, means whereby it is controlled by said shaft, a bracket adjustably clamped to the end of the supporting member and adjustable relative to but positioned by said bearing, a stud carried by the bracket, intermeshing bevel gears carried by the shaft and stud, respectively, and a float arm connected to the bevel gear operating on said stud.

3. In a fluid gage, the combination with a supporting member adapted to be inserted through the wall of a tank, of a bracket carried thereby, an indicator-operating shaft journaled in the supporting member, and indicator means whereby it is controlled by the shaft, intermeshing bevel gears supported on said bracket and shaft, respectively, and by which the shaft is operated, a float arm connected to one of said bevel gears, and adjustable stop members carried by the bracket and by which the swinging movement of the float arm is limited.

4. In a fluid gage, the combination with a supporting member, of a bearing member sustained thereby at one end thereof, an indicator-operating shaft extending longitudinally of said supporting member and journaled in the bearing member, an indicator, means whereby it is controlled by said shaft, a bevel gear on said shaft, a bracket having a foot portion engaging the end of the supporting member and through which the bearing member extends, a nut on the bearing member for clamping the bracket to the tubular member, a bevel gear on the bracket meshing with the bevel gear on the shaft, and a float arm connected to the bevel gear on said bracket.

5. In a fluid gage, the combination with a tubular supporting member, of a bearing member sustained thereby at one end thereof, an indicator-operating shaft extending longitudinally of said supporting member and journaled in the bearing member, an indicator, means whereby it is controlled by said shaft, a bevel gear on said shaft, a bracket having a foot portion engaging the end of the supporting member and through which the bearing member extends, a nut on the bearing member for clamping the bracket to the tubular member, a bevel gear on the bracket meshing with the bevel gear on the shaft, a float arm connected to the bevel gear on said bracket, and adjustable stops on the bracket for limiting the swinging movement of the float arm.

6. In a fluid gage, the combination with a supporting member adapted to extend through the wall of a tank, of an indicator-operating shaft sustained by said supporting member, an indicator, means whereby it is controlled by the shaft, a bracket clamped to said supporting member, intermeshing bevel gears sustained by said shaft and bracket, respectively, a float arm connected to the gear mounted on the bracket, and adjustable stop members secured to the bracket for limiting the swinging movement of the float arm.

7. In a fluid gage, the combination with a supporting member adapted to extend through the wall of a tank, of an indicator-operating shaft sustained by said supporting member, an indicator, means whereby it is controlled by the shaft, a bracket clamped to said supporting member, intermeshing bevel gears sustained by said shaft and bracket, respectively, a float arm connected to the gear mounted on the bracket, said float arm being provided with a laterally-extending finger, and adjustable stop members secured to the bracket and adapted to engage the finger to limit the swinging movement of the float arm.

8. In a fluid gage, the combination with a tubular supporting member adapted to extend through the wall of a tank, of an indicator-operating shaft sustained by said member, an indicator, means whereby it is controlled by said shaft, a bracket secured to the supporting member, a stud mounted on the bracket, intermeshing bevel gears carried by said shaft and stud, respectively, a float arm connected to the bevel gear mounted on the stud, and adjustable stop members carried by said bracket and by which the swinging movement of the float arm is limited.

9. In a fluid gage, the combination with a tank having an aperture in its side and a flange surrounding the aperture, of a gage comprising a one-piece tubular supporting member extending through said aperture and flange and provided with a collar exterior thereto and engaging said flange, means to clamp the collar against the flange, an indicator-operating shaft extending longitudinally of said member, an indicator at the exterior end of said supporting member, means whereby it is controlled by the shaft, a bracket secured to the inner end of said tubular member exterior thereto, intermeshing bevel gears sustained on said bracket and shaft, respectively, a float arm connected to the bevel gear mounted on the bracket, and stops sustained by the bracket for limiting the movement of the float arm.

In testimony whereof, I have signed my name to this specification, in the presence of two subscribing witnesses.

CARL W. STAHLE.

Witnesses:
BERTHA F. HEUSER,
THOMAS J. DRUMMOND.